United States Patent
Kanazawa et al.

(10) Patent No.: US 8,569,413 B2
(45) Date of Patent: Oct. 29, 2013

(54) AQUEOUS COATING COMPOSITION

(75) Inventors: Hidenori Kanazawa, Tokyo (JP); Naoki Satou, Tokyo (JP)

(73) Assignee: Three Bond Co., Ltd., Tokyo (JP)

( * ) Notice: Subject to any disclaimer, the term of this patent is extended or adjusted under 35 U.S.C. 154(b) by 0 days.

(21) Appl. No.: 13/126,808

(22) PCT Filed: Oct. 29, 2009

(86) PCT No.: PCT/JP2009/068628
§ 371 (c)(1),
(2), (4) Date: Apr. 29, 2011

(87) PCT Pub. No.: WO2010/050572
PCT Pub. Date: May 6, 2010

(65) Prior Publication Data
US 2011/0213069 A1     Sep. 1, 2011

(30) Foreign Application Priority Data

Oct. 31, 2008  (JP) ................. 2008-282310

(51) Int. Cl.
| | | |
|---|---|---|
| C08L 27/00 | (2006.01) | |
| C08L 31/04 | (2006.01) | |
| C08L 27/12 | (2006.01) | |
| B32B 27/00 | (2006.01) | |

(52) U.S. Cl.
USPC ........... 524/520; 524/524; 525/199; 428/422; 428/463

(58) Field of Classification Search
USPC ........................................ 524/520
IPC ..................... C09D 1/00; C09K 3/10
See application file for complete search history.

(56) References Cited

U.S. PATENT DOCUMENTS

| 4,243,565 A | * | 1/1981 | Nishino et al. ............... 523/409 |
| 4,400,487 A | * | 8/1983 | Stoneberg et al. ............ 525/199 |
| 5,300,366 A | * | 4/1994 | Nakamaru et al. ............ 428/549 |

FOREIGN PATENT DOCUMENTS

| CN | 1886479 A | | 12/2006 |
| JP | 54029866 A | * | 3/1979 |
| JP | 02-308876 A | | 12/1990 |
| JP | 3-041144 A | | 2/1991 |
| JP | 03041144 A | * | 2/1991 |
| JP | 05-286086 A | | 11/1993 |
| JP | 7-179787 A | | 7/1995 |
| JP | 7179737 A | | 7/1995 |
| JP | 2006-104484 A | | 4/2006 |
| JP | 2007-031559 A | | 2/2007 |
| JP | 2007031559 A | * | 2/2007 |
| WO | 2005/054390 A1 | | 6/2005 |

OTHER PUBLICATIONS

JP 2007-031559A (2007), machine translation, JPO Advanced Industrial Property Network (AIPN).*
JP 03-041144A (1991), translation, FLS Inc.*
JP 03-041144 A (1991), translation, US Patent and Trademark Office, Washington DC, FLS, Inc.*
JP 54-029866 A (1979), translation, US Patent and Trademark Office, Washington DC, Schreiber Translations, Inc.*
JP 03-041144 A (1991), translation, US Patent and Trademark Office, Washington DC, FLS Inc.*
JP 2007-031559 A (2007), machine translation, JPO Advanced Industrial Property Network (AIPN).*
International Search Report (PCT/ISA/210), dated Dec. 28, 2009, issued in Application No. PCT/JP2009/068628.
Written Opinion (PCT/ISA/237), dated Dec. 28, 2009, issued in Application No. PCT/JP2009/068628.
Office Action dated Oct. 29, 2012 issued by the State Intellectual Property Office of P.R. China in counterpart Chinese Patent Application No. 200980143508.4.
Office Action dated Feb. 22, 2013 issued by the Japanese Patent Office in counterpart Japanese Application No. 2008-282310.
Office Action dated Jul. 17, 2013 issued by the State Intellectual Property Office of PRC in counterpart Chinese application No. 200980143508.4.

* cited by examiner

Primary Examiner — David W Wu
Assistant Examiner — Josephine Chang
(74) Attorney, Agent, or Firm — Sughrue Mion, PLLC

(57) ABSTRACT

An aqueous coating composition having excellent coating adhesion, workability, heat resistance and chemical resistance, and has an object to provide an aqueous coating composition for sealing, which is suitable for members to be screwed in. An aqueous coating composition including: as main components, component (A) an ethylene-vinyl acetate copolymer resin emulsion and component (B) two or more PTFE resin powders having different particle diameters, in which 35 to 80 parts by mass of water is contained on the basis of 100 parts by mass of the total of (A) and (B).

6 Claims, 2 Drawing Sheets

AQUEOUS COATING COMPOSITION

TECHNICAL FIELD

The present invention relates to an aqueous coating agent used in coating metal or plastic, and particularly, relates to an aqueous coating composition having excellent coating adhesion, workability in forming a coating film, and oil resistance of the coating film at a high temperature. More particularly, the present invention relates to an aqueous coating composition for sealing, which is coated in order to seal various oils, gases, and water.

BACKGROUND ART

A liquid resin composition has been used for various purposes of a paint, ink, an adhesive, a sealing agent, and a coating agent. The liquid resin composition may be largely classified into a reactive resin composition and a non-reactive resin composition. The reactive resin composition uses a reactive resin such as an epoxy resin, an acryl resin, or a silicone resin as a binder component, and various curing agents, crosslinking agents, reaction initiators, and catalysts are added to solidify and cure the resin at a predetermined timing. Therefore, since various raw components may be combined with each other for the use, the degree of freedom of design was high. Meanwhile, since solidification and curing of the binder component are caused by a chemical reaction, there were some problems in preservation, workability, safety, and an environmental load.

The non-reactive resin composition implements its function by using, as a binder component, the non reactive resin which is not solidified and cured by a chemical reaction, and solidifying the resin mainly by solvent vaporization. Accordingly, the preserving property, workability, and safety are generally good. However, the function such as the durability or the adhesion of the solidified resin falls behind the reactive resin composition.

As a specific purpose of the liquid resin composition, there is a coating agent for sealing having the function of strongly fixing a screwed member at the time of screwing a screw by coating a screwed surface of a screwed member such as a fastener, a bolt, a plug and a nut, and performing sealing by preventing leakage of fluids such as oil or gas from a gap of a screwed part.

As the coating agent for sealing, for example, in a resin composition disclosed in Patent Document 1, a reactive resin reacts with a curing agent by microencapsulating a component for curing the reactive resin and breaking the microcapsule by external forces such as fitting or screwing. As a result of the reaction, the resin composition is cured at the screwed part or fitted part, and a fixing property or a sealing ability is exerted.

Additionally, Patent Document 2 discloses an adhesive using an emulsion of an acryl functional monomer as a binder and encapsulated organic peroxide as a curing agent to prevent unscrewing.

Patent Document 3 discloses a resin laminate having excellent adhesive property or heat resistance, the resin laminate including a layer formed of a thermoplastic fluorine resin composition and modified ethylene-vinyl acetate copolymer, and a resin layer selected from an ethylene copolymer, a chlorine-containing resin, polycarbonate and thermoplastic polyester.

BACKGROUND ART

Patent Document
  Patent Document 1: JP-A-2007-31559
  Patent Document 2: JP-A-2-308876
  Patent Document 3: JP-A-5-286086

SUMMARY OF THE INVENTION

Problems that the Invention is to Solve

However, since the resin composition disclosed in Patent Document 1 uses the reactive resin and is microencapsulated, it has a high preserving property. However, it is difficult to preserve the composition over a long period of time, and if a strong impact is applied during transport, the microcapsule may be broken, thus deteriorating the preserving property. Furthermore, since it is difficult to dissolve the microcapsule in water because of the property of the microcapsule, there is a problem in safety or an environmental load.

Additionally, the adhesive disclosed in Patent Document 2 is a type including a reactive main agent and a reaction initiator (curing agent) that are microencapsulated, among the known microcapsule adhesives, and preservation stability as the adhesive is excellent. However, there is a problem about cost because a great amount of microcapsules is used. In addition, since the available amount of reactive main agent is limited, adhesive force is insufficient. Furthermore, oil resistance is not sufficient.

Further, in the resin laminate disclosed in Patent Document 3, since the laminated structure needs to be formed by two different resin compositions on a subject, there is a problem about workability when coating. Further, while an adhesive property and heat resistance are excellent, a great amount of scraped powder is generated, thereby polluting a work environment when the resin is coated on the screwed member to perform screwing, since cohesive force and flexibility of the resin layer (B layer) selected from ethylene copolymer, chlorine-containing resin, polycarbonate, and thermoplastic polyester are poor.

The purpose of the present invention is to solve the problems of background art, and namely, is to provide an aqueous coating composition that has excellent coating adhesion, workability in forming a coating film, and durability of the coating film at a high temperature, and more particularly, to provide an aqueous coating composition for sealing, which is coated in order to seal various oils, gases, and water.

Means for Solving the Problems

The present invention implements a coating composition having excellent functions as a coating agent such as high durability, strong coating adhesion, and particularly, a sealing ability when the composition is applied to a screwed member, while maintaining preservation, workability in coating, safety or a low environmental load of the composition by using a non-reactive ethylene-vinyl acetate copolymer resin emulsion as a binder component, and combining the binder component and PTFE resin powder having a different particle diameter.

That is, the present invention relates to the following description.

<1> An aqueous coating composition comprising: the following components (A) and (B) as main components, wherein 35 to 80 parts by mass of water is contained based on 100 parts by mass of the total of components (A) and (B):

Component (A): an ethylene-vinyl acetate copolymer resin emulsion;

Component (B): two or more PTFE resin powders having different particle diameters.

<2> The aqueous coating composition according to <1>, wherein a mass ratio (A)/(B) of a solid of component (A) and component (B) is 0.03 to 0.40.

<3> The aqueous coating composition according to claim <1> or <2>, wherein component (B) includes at least (b-1) a PTFE resin powder having an average particle diameter of 2 to 20 μm and (b-2) a PTFE resin powder having an average particle diameter of 20 to 100 μm.

<4> The aqueous coating composition according to <1> or <2>, wherein component (B) includes (b-1) a PTFE resin powder having an average particle diameter of 2 to 20 μm, and (b-2) a PTFE resin powder having an average particle diameter of 20 to 100 μm, and wherein a mass ratio (b-1):(b-2) of (b-1) and (b-2) in component (B) is 5 to 35:95 to 65.

<5> The aqueous coating composition according to any one of <1> to <4>, further comprising: (C) 0.0005 to 1.0 parts by mass of sodium polyacrylate on the basis of 100 parts by mass of the total of components (A) and (B).

<6> The aqueous coating composition according to any one of <1> to <5>, wherein component (A) has a viscosity of 1000 to 5500 mPa·s.

<7> A member of which a surface is coated by the aqueous coating composition according to any one of <1> to <6>.

<8> The member according to <7>, wherein the member is a screwed member.

Advantage of the Invention

The aqueous coating composition of the present invention has excellent coating adhesion, workability in forming a coating film, and durability of the coating film at a high temperature, and the aqueous coating composition is particularly useful as a precoat type screw sealing agent when a screwed member is used as a adherend of the aqueous coating composition, since oils can be effectively sealed.

MODE FOR CARRYING OUT THE INVENTION

Figure 1:
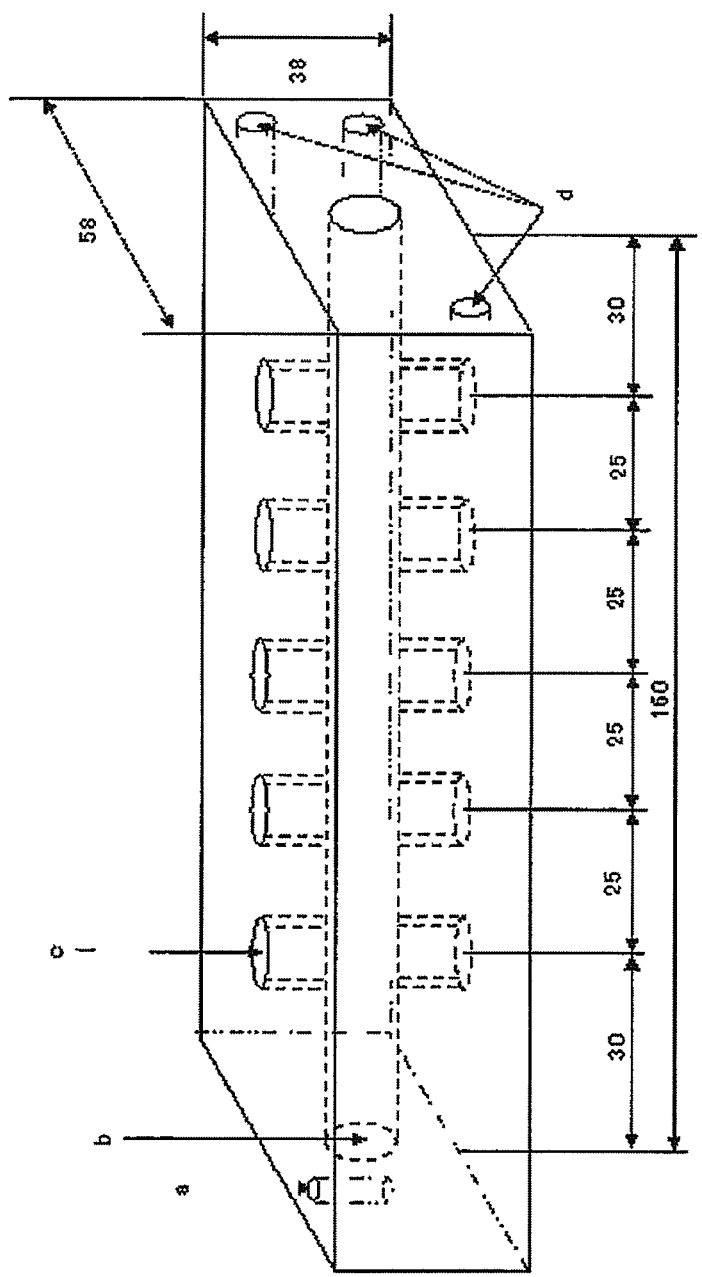
FIG. 1 is a sealing test block made of aluminum that is used to evaluate a sealing ability of an aqueous coating composition of the present invention.

Hereinafter, exemplary embodiments of the present invention are described in detail. An ethylene-vinyl acetate copolymer resin emulsion of component (A) used in the present invention functions as a binder component having excellent adhesion in the coating composition of the present invention, and is combined with two or more PTFE resin powders having different particle diameters of component (B) of the present invention to implement an excellent coating adhesion, such that when the emulsion is used as a coating agent. When the emulsion is particularly used in a screwed member, the coating film does not become detached during screwing because of an excellent cohesive force and flexibility while screwing is performed, and thus, the circumference is not contaminated by scraped powders. Furthermore, since water contained in the composition of the present invention is used to dilute components (A) and (B), and a pressure to the environment may be remarkably reduced by using water as a diluting component.

Herein, as the ethylene-vinyl acetate copolymer resin emulsion, as described in, for example, JP-A-03-041144, an ethylene-vinyl acetate copolymer resin emulsion in which polyvinyl alcohol is used as an emulsion stabilizing agent and which is made of ethylene, vinyl acetate and a vinyl compound capable of being copolymerized with vinyl acetate may be used. However, the method of the present invention is not limited particularly to the preparation method. Incidentally, the coating composition of the present invention includes 35 to 80 parts, and preferably 40 to 60 parts by mass of water on the basis of 100 parts by mass of the total of component (A) and component (B) as described below. Further, a mass ratio (A)/(B) of the solid of component (A) and component (B) may preferably be 0.03 to 0.40 and more preferably 0.10 to 0.25. Moreover, component (A) may have 1000 to 5500 mPa·s and more preferably 2000 to 4000 mPa·s of viscosity as measured according to JIS K 7117 (BL type viscometer, 60 rpm, 1 min, 25° C.). Since component (A) needs to have a high elongation ratio, the elongation ratio of the solidified form of component (A) may preferably be 500% or more, and more preferably 660% or more. Since the coating composition of the present invention requires a high heat resistance in order to ensure a stability of the coating film at a high temperature and may be used at room temperature as well, a glass transition temperature (Tg), which is the standard of an inflection point for physical properties, may preferably be outside a range from room temperature to a high temperature. Preferably, Tg may be less than 40° C., and more preferably less than 0° C. Further, while it is particularly required that the content of ethylene in the ethylene-vinyl acetate copolymer of component (A) is high in order to ensure good coating adhesion, the present invention is not limited thereto.

When the mass ratio (A)/(B) of the solid of component (A) and component (B) is smaller than 0.03, since component (A) is used in an excessively small amount as compared to component (B), component (A) cannot sufficiently perform the function as a binder, thus reducing the coating adhesion. Meanwhile, when (A)/(B) is more than 0.40, since it is difficult to uniformly disperse component (B), the coating film becomes non-uniform, thus generating a uneven thickness called deviation. When the viscosity of component (A) is less than 1000 mPa·s and the coating composition of the present invention is used, a uniform coating film may not be formed since the component does not have a maintenance ability to flow from the adherend. And, when the component is coated on the screwed member by using an automatic coating device and the screwed member has a container shape, the coating agent flows to the outside. Meanwhile, if the viscosity is excessively high such as 5500 mPa·s or more, for example, the workability may be reduced because the uniform coating film cannot be formed when the component is coated on the screwed member using the automatic coating device. It is required that the coating composition of the present invention has flexibility following linear expansion between different materials such as iron and aluminum, and thus, the combined binder having a high elongation ratio is selected. If the elongation ratio of component (A) is less than 500%, when the screwed member such as the screw coated by the coating composition of the present invention is screwed, in particular, where the screwed member is a combination of different materials such as a female screw made of aluminum and a male screw made of iron, the screwed member cannot follow the displacement of each substrate when the difference between linear expansions of the substrates is increased by heat, thus reducing a sealing ability at the screwed member.

Two or more PTFE resin powders of component (B) each having different particle diameters used in the present invention act as a component for maintaining the coating film strength in the coating composition of the present invention, and in particular, are important components providing heat resistance to the coating film. In the present invention, two or more PTFE resin powders having different particle diameters are combined and therefore may be uniformly dispersed in the coating composition liquid and charged in a high density in the coating film. In the coating composition of the present invention, if the PTFE resin powders have the same particle diameter, and, in particular, are small particles having the diameter of 20 μm or less in the composition liquid including component (A), the powders may be easily coagulated. Accordingly, the present invention is characterized in combining and using a plurality of PTFE resin powders having different particle diameters, in particular, the powders having the particle diameters of 2 to 20 μm and 20 to 100 μm. The resulting resin powders will not be coagulated each other, and thus, are uniformly dispersed in the composition liquid by using the combination of the PTFE resin powders having the above particle diameter range. Further, similar to the characteristic of the composition liquid, the PTFE resin powder can be uniformly distributed and charged in a high density even in the coating film, thus providing excellent coating film strength.

Herein, the more desirable average particle diameter of the PTFE resin powder includes at least (b-1) a smaller particle diameter of 2 to 20 μm, and (b-2) a larger particle diameter of 20 to 100 μm. More preferably, the diameter is at least (b-1) in the range of 3 to 8 μM, and (b-2) in the range of 25 to 70 μm. If the difference between the particle diameters of (b-1) and (b-2) is smaller than the above range, the respective PTFE resin powders are coagulated in the composition liquid and do not form the uniform coating film, and therefore good coating film strength cannot be exerted. If the difference between the particle diameters is larger than the above range, the particles having the larger particle diameter cannot perform the function of interrupting the deviation of the particles having the smaller particle diameter, and accordingly, the good coating film strength cannot be exerted. Further, if the particle diameter of (b-2) is larger than the above range, scraped powders are generated, thus, contaminating the work environment when using a method of sealing the screwed part by coating the composition on the screwed member to form the coating film, since the coating film is easily separated by screwing operation during the screwing. Further, if the particle diameter of (b-1) is smaller than the above range, the viscosity of the composition is increased, thus reducing workability. This is because (b-1) is physically bound with component (A) in the composition liquid.

The PTFE resin powder having (b-1) of the small particle diameter capable of being appropriately used in the present invention typically is a powder manufactured by either one of a radiation thermal decomposition method, a thermal decomposition method, an emulsion polymerization method, and a suspension polymerization method, and includes polytetrafluoroethylene having a molecular weight of 1000 to 1,000,000, but is not particularly limited thereto. For example, LUBRON L5 and LUBRON L5F (manufactured by Daikin Industries, Ltd.), TLP-10 and TLP-10F-1 (manufactured by Du Pont-Mitsui Fluorochemicals Co., Ltd.), Fluon L169, Fluon L170, Fluon L171, and Fluon L173J (manufactured by Asahi Glass Co., Ltd.), and KTL-20N, KTL-10N, KTL-8N, KTL-4N, KTL-2N, KTL-450, KT-600M, KTL-610, and KTL-620 (manufactured by Kitamura Limited) may be exemplified as commercial product.

The PTFE resin powder having (b-2) of the large particle diameter capable of being appropriately used in the present invention is a powder polymerized mainly by an emulsion polymerization method or a suspension polymerization method, and includes polytetrafluoroethylene having a molecular weight of million to ten million, but is not particularly limited thereto. For example, Polyflon M12 and Polyflon M15 (manufactured by Daikin Industries, Ltd.), Teflon (registered trademark) 6J, Teflon (registered trademark) 62XT, and Teflon (registered trademark) 6CJ (manufactured by Du Pont-Mitsui Fluorochemicals Co., Ltd.), Fluon G163, Fluon G190, Fluon G307, Fluon G340, Fluon G201, Fluon CD1, Fluon CD123, and Fluon CD076 (manufactured by Asahi Glass Co., Ltd.), and KT-300M and KT-400M (manufactured by Kitamura Limited) may be exemplified as commercial product.

Further, in the present invention, the mass ratio (b-1):(b-2) of (b-1) and (b-2) in component (B) may be 5 to 35:95 to 65, and more preferably 10 to 30:90 to 70. If the mass ratio of (b-1) in component (B) is smaller than 5/100 and is larger than 35/100, it is difficult to uniformly disperse each of (b-1) and (b-2) in the coating composition of the present invention. As a result, the deviation occurs in the composition liquid, thus causing deviations in the coating film. Also, the viscosity may be largely increased, thereby reducing workability.

In the present invention, 0.0005 to 1.0 parts by mass, and more preferably 0.001 to 0.1 parts by mass of sodium polyacrylate of component (C) on the basis of 100 parts of the total of components (A) and (B) by mass may be contained in the composition. In the present invention, component (C) acts as a viscoelastic controlling agent of the coating film, and is a component contributing to forming the flat and uniform coating film when the coating film is formed. In particular, when the coating composition of the present invention is coated on the screwed member such as a screw by an automatic coating device, the automatic coating device applies the coating composition while rotating the screwed member at a predetermined rpm in a horizontal state, and since the coated screwed member is dried in a drier while rotating, the coating composition is collected at the end or the head of the screw through the spiral of the screw. If the rotation of the automatic coating device is stopped, sagging rapidly starts, and thus, it is required to perform the coating without stopping the rotation. However, this phenomenon may be suppressed by adding component (C). In the present invention, if component (C) is added to the combination of components (A) and (B), component (C) is particularly useful to the coating process of the automatic coating device.

Sodium polyacrylate having the average molecular weight in the range of a hundred thousand to ten million, and more preferably half a million to five million may be used as component (C) in the present invention. As described above, component (C) of the present invention acts as the viscoelastic controlling agent, and sodium polyacrylate is a viscoelastic controlling agent that is particularly effective to the combination of components (A) and (B) as main components of the present invention. Further, the addition amount of component (C) may be 0.0005 to 1.0 parts by mass and more preferably 0.01 to 0.5 parts by mass on the basis of 100 parts by mass of the total of components (A) and (B). If the added amount of component (C) is smaller than 0.0005 parts by mass, a viscoelastic controlling effect is not sufficient, and thus, the uniform coating film coating the thread of a screw may not be formed when component (C) is coated on the screwed part. Meanwhile, if the added amount of component (C) is more than 1.0 part by mass, since the viscoelastic controlling effect is excessively increased to reduce permeability or fluidity during the coating, coating workability is reduced. Further, since the viscosity of the composition liquid is increased, handling and discharging properties of the composition liquid are reduced. For example, SN thickener 618 and SN thickener A-818 (manufactured by San Nopco Limited), and ARON A-20L (manufactured by Toagosei Co., Ltd.) may be exemplified as commercial products.

The aqueous coating composition of the present invention includes components (A) and (B) described above, and optionally, component (C) as the main configuration components, but the other components may be added thereto if necessary. For example, a pH controlling agent, a corrosion inhibitor, an defoaming agent, a body pigment, a stabilizer, a coloring agent, a tackifier, an aging inhibitor, a dispersion auxiliary agent, a film-forming auxiliary agent, and an anti-setting agent may be added in a predetermined amount in a range at which the function of the present invention is not suppressed, so that predetermined physical properties may be maintained. In particular, when the composition liquid is coated, the uniform coating film may be obtained by adding the defoaming agent or dispersing agent. One or more silicone-based surfactants such as BYK-019, BYK-020, BYK-023, BYK-024, BYK-065, BYK-066, BYK-067, BYK-070, BYK-088, and BYK-080A (all manufactured by BYK Japan KK) may be used as the defoaming and dispersing agent.

In a preferred embodiment of the present invention, the aqueous coating composition is coated on the surface of the member to form a cured coating film, thereby coating the member. In particular, the coating composition is suitable for applying to the member requiring friction resistance and adhesion such as a friction surface. The present invention also relates to a member of which a surface is coated by the aqueous coating composition.

One of the most desirable embodiment of coated members of the present invention includes the sealing of the screwed member. In particular, by coating the composition on the screw, the composition is useful as a precoat type of screw sealing agent because the coating film having excellent friction resistance and adhesion is formed, and the screwed surface is strongly sealed over a long period of time while the coating film is not peeled by screwing.

For example, as the screwed member other than the screw, there are screw joints such as nipples, sockets, plugs, and elbows having the screwed surface, but the screwed member is not particularly limited thereto.

EXAMPLES

A better understanding of the aqueous coating composition of the present invention may be obtained in light of the following exemplary embodiments which are set forth to illustrate the present invention. However, the exemplary embodiments are not to be construed to limit the present invention.

Preparation Examples 1 to 15 and Comparative Preparation Examples 1 to 8

Preparation of the Aqueous Coating Composition

The aqueous coating compositions used in Examples and Comparative Examples were prepared by using the following components.

[Component (A)]
SUMIKAFLEX 410HQ (ethylene-vinyl acetate copolymer resin emulsion, Tg −18° C., viscosity 3000 mPa·s, elongation 700%, solid content 53%, product of Sumika Chemtex Co., Ltd., hereinafter, referred to as "410HQ")

SUMIKAFLEX 408HQE (ethylene-vinyl acetate copolymer resin emulsion, Tg 0° C., viscosity 800 mPa·s, elongation 650%, solid content 50%, product of Sumika Chemtex Co., Ltd., hereinafter, referred to as "408HQE")

Polysol EVA EL-851 (ethylene-vinyl acetate copolymer resin emulsion, Tg 0° C., viscosity 10,000 mPa·s, elongation 1200%, solid content 50%, product of Showa Highpolymer Co., Ltd., hereinafter, referred to as "EL-851")

Polysol AP-6750 (styrene.acryl synthetic resin emulsion, Tg 36° C., viscosity 4000 mPa·s, elongation 150%, solid content 45%, product of Showa Highpolymer Co., Ltd., hereinafter, referred to as "AP-6750")

VONCOAT4280 (styrene.acryl synthetic resin emulsion, Tg 20° C., viscosity 500 mPa·s, elongation 450%, solid content 40%, product of Dainippon Ink & Chemicals, Inc., hereinafter, referred to as "4280")

[Component (B)]
Lubron L-5F (PTFE powder having an average particle diameter of 5 μm, product of Daikin Industries, Ltd., hereinafter, referred to as "L-5F")

KTL-450 (PTFE powder having an average particle diameter of 19 μm, product of Kitamura Limited)

KT-300M (PTFE powder having an average particle diameter of 40 μm, product of Kitamura Limited)

Lubron L-2 (PTFE powder having an average particle diameter of 0.3 μm, product of Daikin Industries, Ltd., hereinafter, referred to as "L-2")

Teflon (registered trademark) 850A (PTFE powder having an average particle diameter of 350 μm, product of Du Pont-Mitsui Fluorochemicals Company, Ltd., hereinafter, referred to as "850A")

TORAYFIL R-900 (silicone resin powder having an average particle diameter of 20 μm, product of Dow Corning Toray Silicone Co., Ltd., hereinafter, referred to as "R-900")

PPW-5 (polypropylene powder having an average particle diameter of 5 μm, product of Seishin Enterprise Co., Ltd.)

SK-PE-20L (polyethylene powder having an average particle diameter of 20 μm, product of Seishin Enterprise Co., Ltd.)

[Component (C)]
SN thickener A-818 (sodium polyacrylate having an average molecular weight of 1400000, product of San Nopco Limited, hereinafter, referred to as "A-818")

JULIMER AC-70N (sodium polyacrylate having an average molecular weight of 10000, product of Nihon Junyaku Co., Ltd., hereinafter, referred to as "AC-70N")

ARON A-20L (polyacrylic acid having an average molecular weight of 500000, product of Toagosei Co., Ltd., hereinafter, referred to as "A-20L")

ARON A-7155 (sodium polycarboxylate having an average molecular weight of 500000, product of Toagosei Co., Ltd., hereinafter, referred to as "A-7155")

ARON A-7185 (sodium polysulfonate having an average molecular weight of 500000, product of Toagosei Co., Ltd., hereinafter, referred to as "A-7185")

[Other Additive Components]
Film-forming Auxiliary Agent
SOLFIT (3-methoxy-3-methyl-1-butanol, product of Kuraray Co., Ltd.)
PhFG (propyleneglycolmonomethyletheracetate, product of Nippon Nyukazai Co., Ltd.)
Anti-setting.Defoaming Agent
BYK-019 (silicone-based surfactant, product of BYK Japan KK, hereinafter, referred to as "019")
BYK-024 (silicone-based surfactant, product of BYK Japan KK, hereinafter, referred to as "024")

Wetting Dispersing Agent
SILWET L-77 (polyether-denatured silicone-based surfactant, product of Momentive Performance Materials Inc., hereinafter, referred to as "L-77")

The aqueous coating compositions of Examples and Comparative Examples were prepared according to the composition of Tables 1 and 2 using the above components. In addition, numerical values described in Tables 1 and 2 indicate parts by mass of addition.

TABLE 1

| | | | colspan="7" Working Example |
|---|---|---|---|---|---|---|---|---|---|
| | | | Prep. Ex. 1 | Prep. Ex. 2 | Prep. Ex. 3 | Prep. Ex. 4 | Prep. Ex. 5 | Prep. Ex. 6 | Prep. Ex. 7 |
| (A) | | 410HQ | 20 | 35 | 10 | | | 20 | 20 |
| | | EL-851 | | | | 20 | | | |
| | | 408HQE | | | | | 20 | | |
| | | AP-6750 | | | | | | | |
| | | 4280 | | | | | | | |
| (B) | (b-1) | L-5F | 10 | 10 | 10 | 10 | 10 | | |
| | | KTL-450 | | | | | | 10 | |
| | | L-2 | | | | | | | 10 |
| | | PPW-5 | | | | | | | |
| | (b-2) | KT-300M | 45 | 45 | 45 | 45 | 45 | 45 | 45 |
| | | 850A | | | | | | | |
| | | R-900 | | | | | | | |
| | | SK-PE-20L | | | | | | | |
| (C) | | A-818 | 0.6 | 0.6 | 0.6 | 0.6 | 0.6 | 0.6 | 0.6 |
| | | AC-70N | | | | | | | |
| | | A-20L | | | | | | | |
| | | A-7155 | | | | | | | |
| | | A-7185 | | | | | | | |
| Ion exchanging water | | | 42 | 42 | 42 | 42 | 42 | 42 | 42 |
| Film-forming auxiliary agent | | Solfit | 0.7 | 0.7 | 0.7 | 0.7 | 0.7 | 0.7 | 0.7 |
| | | PhFG | 0.5 | 0.5 | 0.5 | 0.5 | 0.5 | 0.5 | 0.5 |
| Wetting dispersion agent | | L-77 | 0.2 | 0.2 | 0.2 | 0.2 | 0.2 | 0.2 | 0.2 |
| Defoaming agent | | 019 | 0.6 | 0.6 | 0.6 | 0.6 | 0.6 | 0.6 | 0.6 |
| | | 024 | 0.4 | 0.4 | 0.4 | 0.4 | 0.4 | 0.4 | 0.4 |
| Total | | | 120 | 135 | 110 | 120 | 120 | 120 | 120 |

| | | | colspan="8" Working Example |
|---|---|---|---|---|---|---|---|---|---|---|
| | | | Prep. Ex. 8 | Prep. Ex. 9 | Prep. Ex. 10 | Prep. Ex. 11 | Prep. Ex. 12 | Prep. Ex. 13 | Prep. Ex. 14 | Prep. Ex. 15 |
| (A) | | 410HQ | 20 | 20 | 20 | 20 | 20 | 20 | 20 | 20 |
| | | EL-851 | | | | | | | | |
| | | 408HQE | | | | | | | | |
| | | AP-6750 | | | | | | | | |
| | | 4280 | | | | | | | | |
| (B) | (b-1) | L-5F | 10 | 18 | 5 | 10 | 10 | 10 | 10 | 10 |
| | | KTL-450 | | | | | | | | |
| | | L-2 | | | | | | | | |
| | | PPW-5 | | | | | | | | |
| | (b-2) | KT-300M | | 37 | 50 | 45 | 45 | 45 | 45 | 45 |
| | | 850A | 45 | | | | | | | |
| | | R-900 | | | | | | | | |
| | | SK-PE-20L | | | | | | | | |
| (C) | | A-818 | 0.6 | 0.6 | 0.6 | | | | | |
| | | AC-70N | | | | 0.6 | | | | |
| | | A-20L | | | | | 0.6 | | | |
| | | A-7155 | | | | | | 0.6 | | |
| | | A-7185 | | | | | | | 0.6 | 0.6 |
| Ion exchanging water | | | 42 | 42 | 42 | 42 | 42 | 42 | 42 | 42 |
| Film-forming auxiliary agent | | Solfit | 0.7 | 0.7 | 0.7 | 0.7 | 0.7 | 0.7 | 0.7 | 0.7 |
| | | PhFG | 0.5 | 0.5 | 0.5 | 0.5 | 0.5 | 0.5 | 0.5 | 0.5 |
| Wetting dispersion agent | | L-77 | 0.2 | 0.2 | 0.2 | 0.2 | 0.2 | 0.2 | 0.2 | 0.2 |
| Defoaming agent | | 019 | 0.6 | 0.6 | 0.6 | 0.6 | 0.6 | 0.6 | 0.6 | 0.6 |
| | | 024 | 0.4 | 0.4 | 0.4 | 0.4 | 0.4 | 0.4 | 0.4 | 0.4 |
| Total | | | 120 | 120 | 120 | 120 | 120 | 120 | 120 | 119.4 |

TABLE 2

| | | | Comparative Example | | | | | | | |
|---|---|---|---|---|---|---|---|---|---|---|
| | | | Comp. Prep. Ex. 1 | Comp. Prep. Ex. 2 | Comp. Prep. Ex. 3 | Comp. Prep. Ex. 4 | Comp. Prep. Ex. 5 | Comp. Prep. Ex. 6 | Comp. Prep. Ex. 7 | Comp. Prep. Ex. 8 |
| (A) | | 410HQ | | | 20 | 20 | 20 | 20 | 20 | |
| | | EL-851 | | | | | | | | |
| | | 408HQE | | | | | | | | |
| | | AP-6750 | 20 | | | | | | | 20 |
| | | 4280 | | 20 | | | | | | |
| (B) | (b-1) | L-5F | 10 | 10 | 55 | | | 10 | | |
| | | KTL-450 | | | | | | | | |
| | | L-2 | | | | | | | | |
| | | PPW-5 | | | | | 10 | | 10 | 10 |
| | (b-2) | KT-300M | 45 | 45 | | 55 | | | | |
| | | 850A | | | | | 45 | | | |
| | | R-900 | | | | | | 45 | | 45 |
| | | SK-PE-20L | | | | | | | 45 | |
| (C) | | A-818 | 0.6 | 0.6 | 0.6 | 0.6 | 0.6 | 0.6 | 0.6 | 0.6 |
| | | AC-70N | | | | | | | | |
| | | A-20L | | | | | | | | |
| | | B-300K | | | | | | | | |
| | | A-7158 | | | | | | | | |
| Ion exchanging water | | | 42 | 42 | 42 | 42 | 42 | 42 | 42 | 42 |
| Film-forming auxiliary agent | | Solfit | 0.7 | 0.7 | 0.7 | 0.7 | 0.7 | 0.7 | 0.7 | 0.7 |
| | | PhFG | 0.5 | 0.5 | 0.5 | 0.5 | 0.5 | 0.5 | 0.5 | 0.5 |
| Wetting dispersion agent | | L-77 | 0.2 | 0.2 | 0.2 | 0.2 | 0.2 | 0.2 | 0.2 | 0.2 |
| Defoaming agent | | 019 | 0.6 | 0.6 | 0.6 | 0.6 | 0.6 | 0.6 | 0.6 | 0.6 |
| | | 024 | 0.4 | 0.4 | 0.4 | 0.4 | 0.4 | 0.4 | 0.4 | 0.4 |
| Total | | | 120 | 120 | 120 | 120 | 120 | 120 | 120 | 120 |

Working Examples 1 to 15 and Comparative Examples 1 to 8

Method for Evaluating Characteristics of the Aqueous Coating Composition

Evaluation method of liquid property: Changes in initial viscosity and initial liquid property of each composition manufactured in Preparation Examples and Comparative Preparation Examples were evaluated. After each composition was prepared, left for 10 min, and agitated with an agitation rod, the initial viscosity was measured by the viscosity measuring method according to JIS K 7117 (BL type viscometer, 60 rpm, 1 min, 25° C.). The change of initial liquid property of each composition was identified immediately after the preparation and 10 min after the preparation while the agitation was performed with the agitation rod. The change of initial liquid property immediately after the preparation and 10 min after the preparation was evaluated as A when most properties were not changed, B when the viscosity was slightly increased, C when the viscosity was obviously increased, and D when the agitation could not be performed due to gelation.

Evaluation method of coating film property: The coating film of each composition manufactured in Preparation Examples and Comparative Preparation Examples were manufactured, and an appearance of the coating film after drying was confirmed by the visual contact to evaluate the coating film property. Further, the coating film used to evaluate the coating film property was manufactured by forming an embankment made of a PP plate at the external circumference of the steel specimen according to JIS G 3141, injecting each composition liquid to the inside of the embankment to control the thickness of the dried film to 400 μm, and leaving the dried film at 80° C. for 30 min. The coating film was confirmed by the visual contact, and was evaluated as A when the surface was flat and there were no breakage, deviation, and pinholes, B when a few breakage, deviation, and pinholes were observed, C when relatively many breakage, deviation, and pinholes were observed, and D when a lot breakage, deviation, and pinholes were observed.

Evaluation method of the coating film strength: The coating film strength of each composition manufactured in Preparation Examples and Comparative Preparation Examples was evaluated as using the bending resistance test according to JIS K 5400. The coating film was manufactured by using the same method as the evaluation of the coating film property and coated on the steel plate according to JIS G 3141. The results of performing the bend resistance test were evaluated as A when there were no breakage and peeling on the surface of the coating film, "scratched" when breakage was observed, "peeled" when peeling was observed, and D when both breakage and peeling were observed.

Evaluation method of dryness: The dryness of each composition manufactured in Preparation Examples and Comparative Preparation Examples was evaluated by using the drying period test according to JIS K 5400. The coating film was manufactured by using the same method as the evaluation of the coating film property, coated on the steel plate according to JIS G 3141, and left at normal temperature. Then, the dryness was evaluated as the time required until the film did not attach to a finger tip when the film was touched lightly by the finger tip.

Evaluation method of device coating ability: The rotation speed of the rotator was set to 40 rotation/min by using the simple automatic coating device in which the fixed part made of magnets was attached to the end of the rotator controlling the number of rotations, and the liquid drop provider was fixed to the external edge of the rotator to evaluate the device coating ability. The head of the bolt treated with zinc-plated chromate having a pitch of 1.5, M10, and the length of 20 mm was fixed to the fixed part of the automatic coating device, and each composition manufactured in Preparation Examples and Comparative Preparation Examples was dropped down from the liquid drop provider and coated from the end of the bolt to the head of the bolt at an interval of 16 mm for one bolt, while the thickness of the dried film in the thread of the screw was controlled to 400 μm. After the coating, the rotation was continued for 1 min at the above rotation speed. Thereafter, the bolt was separated from the simple automatic coating device, and each composition attached to the bolt was confirmed by the visual contact. The device coating ability was evaluated as A when the attachment state of the uncured composition was hardly ever changed immediately after the coating and after the rotation was finished, B when a few deviations were observed (the attachment of the composition liquid to the bolt was biased), C when a portion of the surface of the bolt on which the composition liquid was coated after the movement was exposed, and D when most of the surface of the bolt was exposed.

Evaluation method of fastening resistance: Each composition manufactured in Preparation Examples and Comparative Preparation Examples was uniformly coated for one bolt treated with zinc-plated chromate having a pitch of 1.5, M10, and the length of 20 mm, while the thickness of the dried film of the coating film in the thread of the screw was controlled to 400 μm. The nut treated with zinc-plated chromate having the same diameter and the same pitch was fastened by one to two threads, and the head of each bolt was fixed by the vise. The nut temporarily screwed to the bolt was screwed by one rotation at a speed of 0.5 to 1 rotation/sec by using the torque wrench manufactured by Tohnichi Mfg. Co., Ltd. In this case, the fastening torque was measured every one rotation, and the evaluation was performed by using the maximum value to five rotations.

Figure 2:
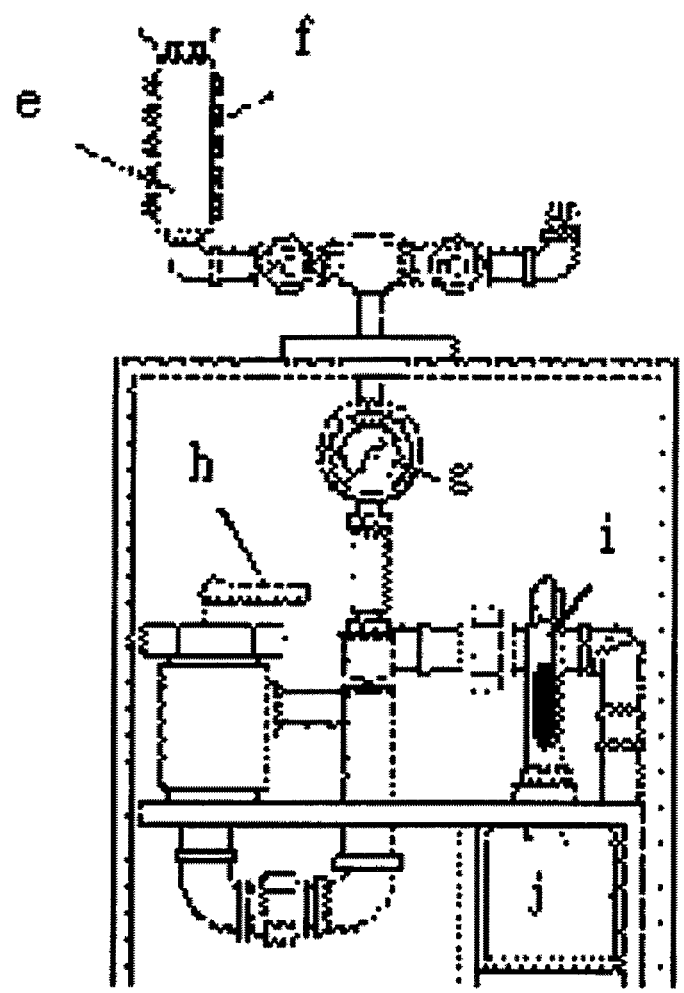
FIG. 2 is a sealing tester that is used to evaluate a sealing ability of an aqueous coating composition of the present invention.

Evaluation method of gas sealing ability: Each composition manufactured in Preparation Examples and Comparative Preparation Examples was coated and processed on the bolt by using the same coating method as the evaluation of the device coating ability. Ten bolts were assembled with the sealing test block that is made of aluminum as shown in FIG. 1, and the block was assembled with the sealing tester as shown in FIG. 2. Pressure was applied to the sealing test block that is made of aluminum by nitrogen gas, and the gas sealing ability was evaluated. The initial pressure of the nitrogen gas applied to the sealing test block was 0.5 MPa, and the pressure was maintained for 5 min to confirm the leakage. In this case, the gas sealing ability was evaluated as D when leakage occurs. Further, the pressure was increased stepwise by 0.5 MPa for every 2 min, and the pressure was confirmed at the time of the occurrence of leakage. Further, the final pressure was set to 12 MPa, and the evaluation was performed using the pressure value at the time of the occurrence of leakage.

Evaluation method of oil sealing ability: The turbine oil (RIX turbine oil manufactured by Japan Energy Corporation) was charged in the same sealing test block as the evaluation of the gas sealing ability, and the block was assembled with the same sealing tester as the evaluation of the gas sealing ability. The test method and the evaluation method were based on the evaluation of the gas sealing ability. Further, in the evaluation of the oil sealing ability, the test was performed while the temperature of oil charged in the sealing test block was maintained at 25° C. and 170° C.

Evaluation method of oil resistance of the coating film: Oil resistance of the coating film of each composition manufactured in Preparation Examples and Comparative Preparation Examples was evaluated by forming the same specimen as the evaluation of the coating film property and dipping the specimen in turbine oil maintained at 80° C. (RIX turbine oil manufactured by Japan Energy Corporation) for 7 days. Further, the specimen was manufactured so that the thickness of the dried film of the coating film was controlled to 0.5 mm, and the oil resistance was evaluated by measuring a change in mass before and after the specimen was dipped in the turbine oil. The specimen was cleaned slightly with ethanol after the dipping. The oil resistance was considered a success when the change in mass before and after the dipping was −5% to 20% and represented by B, and represented by D when the change in mass before and after the dipping was less than −5% and more than 20%.

Evaluation method of heat resistance: A change in characteristics before and after the preservation at 40° C. for 6 days was compared and evaluated by using the same test method as the measurement of viscosity according to JIS K 7117 (BL type viscometer, 60 rpm, 1 min, 25° C.) and the evaluation of the oil sealing ability. In the measurement of viscosity, each composition manufactured in Preparation Examples and Comparative Preparation Examples was preserved as the uncured composition liquid. And in the evaluation of the sealing ability, each composition was preserved while being coated and processed on the bolt.

Evaluation method of grinding resistance: Each composition manufactured in Preparation Examples and Comparative Preparation Examples was coated on the bolt by using the same method as the evaluation of the fastening resistance, and the specimen was manufactured by screwing the bolt and the nut. The bolt and the nut that were screwed were separated from the specimen, and the residual amount of coating film from the screwed part of the nut on the surface of the bolt was confirmed. The grinding resistance was evaluated as A when the coating film was hardly ever peeled from the surface of the bolt and remained, B when the coating film was slightly peeled, and D when the coating film was obviously peeled.

Characteristics of the aqueous coating compositions manufactured in Preparation Examples 1 to 15 and Comparative Preparation Examples 1 to 8 were evaluated by using the above method. The results are described in Tables 3 and 4.

TABLE 3

| | | Working Example | | | | | | |
|---|---|---|---|---|---|---|---|---|
| | | Prep. Ex. 1 | Prep. Ex. 2 | Prep. Ex. 3 | Prep. Ex. 4 | Prep. Ex. 5 | Prep. Ex. 6 | Prep. Ex. 7 |
| Liquid property | Gelation | A | A | A | A | A | A | B |
| | Viscosity [mPa · s] | 700 | 320 | 1500 | 2000 | 1900 | 660 | 1220 |
| Coating film property | Coating film property | A | A | B | C | B | C | B |
| | Coating film strength | A | A | A | Peeled | Peeled | A | Scratched |
| | Dryness [min] | 20 | 20 | 15 | 20 | 20 | 20 | 20 |
| | Device coating ability | A | B | B | B | B | B | B |
| Sealing characteristic | Fastening resistance [N · m] | 2.0 | 2.0 | 2.0 | 1.0 | 1.0 | 2.0 | 3.0 |
| | Gas sealing ability [Mpa] | 2 | 2 | 2 | 0.2 | 2 | 1 | 0.2 |
| | Oil 25° C. [MPa] | 12 | 12 | 12 | 3 | 12 | 12 | 2 |

TABLE 3-continued

|  |  |  |  |  |  |  |  |  |  |
|---|---|---|---|---|---|---|---|---|---|
|  |  | sealing ability 170° C. [MPa] | 12 | 12 | 12 | 2 | 4 | 12 | 2 |
| Durability | Coating film oil resistance |  | B | B | B | B | B | B | B |
|  | 40° C. | Viscosity after 1 day [mPa·s] | 720 | 400 | 1670 | 2300 | 2150 | 800 | 1360 |
|  |  | Viscosity after 6 days [mPa·s] | 750 | 430 | 1710 | 2370 | 2330 | 900 | 1360 |
|  |  | Sealing ability after 1 day [MPa] | 12 | 12 | 12 | 4 | 4 | 12 | 3 |
|  |  | Sealing ability after 6 days [MPa] | 12 | 12 | 12 | 3 | 4 | 12 | 3 |
|  | Grinding resistance |  | A | A | A | B | B | B | B |

|  |  | Working Example |  |  |  |  |  |  |  |
|---|---|---|---|---|---|---|---|---|---|
|  |  | Prep. Ex. 8 | Prep. Ex. 9 | Prep. Ex. 10 | Prep. Ex. 11 | Prep. Ex. 12 | Prep. Ex. 13 | Prep. Ex. 14 | Prep. Ex. 15 |
| Liquid property | Gelation | A | A | A | A | C | C | C | C |
|  | Viscosity [mPa·s] | 660 | 1150 | 450 | 400 | 1200 | 1500 | 640 | 590 |
| Coating film property | Coating film property | C | B | B | A | B | B | B | B |
|  | Coating film strength | Peeled | A | A | A | A | A | A | A |
|  | Dryness [min] | 20 | 20 | 20 | 20 | 20 | 20 | 20 | 20 |
|  | Device coating ability | C | B | B | B | C | C | C | D |
| Sealing characteristic | Fastening resistance [N·m] | 1.0 | 2.0 | 2.0 | 2.0 | 2.0 | 2.0 | 2.0 | 2.0 |
|  | Gas sealing ability [Mpa] | 0.2 | 2 | 2 | 2 | 2 | 1 | 1 | 0.2 |
|  | Oil sealing ability 25° C. [MPa] | 12 | 12 | 12 | 12 | 12 | 8 | 8 | 3 |
|  | 170° C. [MPa] | 4 | 12 | 12 | 12 | 9 | 3 | 3 | 1 |
| Durability | Coating film oil resistance | B | B | B | B | B | B | B | B |
|  | 40° C. Viscosity after 1 day [mPa·s] | 890 | 1300 | 680 | 640 | 1360 | 1690 | 920 | 860 |
|  | Viscosity after 6 days [mPa·s] | 920 | 1450 | 730 | 720 | 1420 | 1800 | 1030 | 1060 |
|  | Sealing ability after 1 day [MPa] | 2 | 12 | 12 | 11 | 7 | 2 | 1 | 1 |
|  | Sealing ability after 6 days [MPa] | 2 | 12 | 12 | 9 | 7 | 1 | 1 | D |
|  | Grinding resistance | B | A | B | A | A | A | A | B |

TABLE 4

|  |  | Comparative Example |  |  |  |
|---|---|---|---|---|---|
|  |  | Comp. Prep. Ex. 1 | Comp. Prep. Ex. 2 | Comp. Prep. Ex. 3 | Comp. Prep. Ex. 4 |
| Liquid property | Gelation | D | D | C | B |
|  | Viscosity [mPa·s] | 960 | 1690 | 1240 | 440 |
| Coating film property | Coating film property | D | D | D | D |
|  | Coating film strength | Peeled | Peeled | Peeled | Scratched |
|  | Dryness [min] | 15 | 25 | 20 | 20 |
|  | Device coating ability | D | D | D | C |
| Sealing characteristic | Fastening resistance [N·m] | 3.0 | 4.0 | 0.5 or less | 2.0 |
|  | Gas sealing ability [Mpa] | D | D | D | 2 |
|  | Oil sealing ability 25° C. [MPa] | 4 | 4 | D | 12 |
|  | 170° C. [MPa] | D | D | D | 2 |
| Durability | Coating film oil resistance | D | D | D | B |
|  | 40° C. Viscosity after 1 day [mPa·s] | 990 | 1900 | 2000 | 560 |
|  | Viscosity after 6 days [mPa·s] | 1030 | 2000 or more | 2000 or more | 600 |

TABLE 4-continued

|  |  | Comp. Prep. Ex. 5 | Comp. Prep. Ex. 6 | Comp. Prep. Ex. 7 | Comp. Prep. Ex. 8 |
|---|---|---|---|---|---|
|  | Sealing ability after 1 day [MPa] | D | D | D | 2 |
|  | Sealing ability after 6 days [MPa] | D | D | D | 2 |
|  | Grinding resistance | C | C | D | D |

| | | Comparative Example | | | |
|---|---|---|---|---|---|
| | | Comp. Prep. Ex. 5 | Comp. Prep. Ex. 6 | Comp. Prep. Ex. 7 | Comp. Prep. Ex. 8 |
| Liquid property | Gelation | C | C | C | D |
| | Viscosity [mPa · s] | 520 | 960 | 800 | 1100 |
| Coating film property | Coating film property | D | C | D | D |
| | Coating film strength | Peeled and Scratched | Peeled and Scratched | Peeled and Scratched | Peeled and Scratched |
| | Dryness [min] | 20 | 20 | 20 | 15 |
| | Device coating ability | D | D | D | D |
| Sealing characteristic | Fastening resistance [N · m] | 1.0 | 2.0 | 2.0 | 3.0 |
| | Gas sealing ability [Mpa] | 0.4 | 0.4 | 0.4 | D |
| | Oil sealing ability 25° C. [MPa] | 6 | 10 | 4 | 4 |
| | Oil sealing ability 170° C. [MPa] | D | D | D | D |
| Durability | Coating film oil resistance | D | D | D | D |
| | 40° C. Viscosity after 1 day [mPa · s] | 1100 | 1190 | 1030 | 1450 |
| | Viscosity after 6 days [mPa·s] | 1360 | 1410 | 1330 | 1720 |
| | Sealing ability after 1 day [MPa] | D | D | D | D |
| | Sealing ability after 6 days [MPa] | D | 3 | D | D |
| | Grinding resistance | D | D | D | D |

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2008-282310 filed on Oct. 31, 2008, and the contents are incorporated herein by reference.

Industrial Applicability

The aqueous coating composition of the present invention has excellent coating adhesion, workability in forming the coating film, durability of the coating film at a high temperature, and durability to various chemicals such as alkali, alcohol, oil, water, and gas. And further, when the composition is coated between the screwed members, the composition can be suitably used as a precoat type screw sealing agent for sealing oil, gas, and water, since the composition has excellent displacement following for each substrate during heating to even the combination of the screwed members having different materials.

Description of Reference Numerals and Signs

| a. | Hole for temperature sensor |
| b. | Oil influx pathway (connecting to sealing test block) |
| c. | Test bolt insertion hole |
| d. | Hole for thermocouple |
| e. | Sealing test block made of aluminum |
| f. | Test bolt |
| g. | Manometer |
| h. | Pressure reducing valve |
| i. | Manual pump |
| j. | Oil tank |

The invention claimed is:

1. An aqueous coating composition comprising: the following components (A) and (B) as main components, wherein 35 to 80 parts by mass of water is contained based on 100 parts by mass of the total of components (A) and (B):
    Component (A): an ethylene-vinyl acetate copolymer resin emulsion; Component (B): two or more PTFE resin powders having different particle diameters, wherein the powders have a predetermined particle diameter range, wherein component (B) includes (b-1) a PTFE resin powder having an average particle diameter of 2 to 20 μm and (b-2) a PTFE resin powder having an average particle diameter of 20 to 100 μm, and wherein a mass ratio (b-1):(b-2) of (b-1) and (b-2) in component (B) is 5 to 35: 95 to 65.

2. The aqueous coating composition according to claim 1, wherein a mass ratio (A)/(B) of a solid of component (A) and component (B) is 0.03 to 0.40.

3. The aqueous coating composition according to claim 1, further comprising: (C) 0.0005 to 1.0 parts by mass of sodium polyacrylate on the basis of 100 parts by mass of the total of components (A) and (B).

4. The aqueous coating composition according to claim 1, wherein component (A) has a viscosity of 1000 to 5500 mPa·s.

5. A member of which a surface is coated by the aqueous coating composition according to claim 1.

6. The member according to claim 5, wherein the member is a screwed member.

* * * * *